(12) United States Patent
Bleys et al.

(10) Patent No.: US 8,283,421 B2
(45) Date of Patent: Oct. 9, 2012

(54) COMPOSITION FROM A POLYISOCYANATE AND A POLYETHER MONOAMINE

(75) Inventors: Gerhard Jozef Bleys, Heverlee (BE); Hans Godelieve Guido Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 69 days.

(21) Appl. No.: 12/808,763

(22) PCT Filed: Dec. 5, 2008

(86) PCT No.: PCT/EP2008/066845
§ 371 (c)(1),
(2), (4) Date: Sep. 8, 2010

(87) PCT Pub. No.: WO2009/080465
PCT Pub. Date: Jul. 2, 2009

(65) Prior Publication Data
US 2011/0003944 A1    Jan. 6, 2011

(30) Foreign Application Priority Data
Dec. 19, 2007  (EP) .................................. 07123610

(51) Int. Cl.
*C08G 18/50* (2006.01)
*C08G 18/09* (2006.01)
(52) U.S. Cl. ........... 525/457; 525/452; 525/460; 528/44
(58) Field of Classification Search .......... 525/452–460; 528/44–85
See application file for complete search history.

(56) References Cited

U.S. PATENT DOCUMENTS

| 4,255,203 A | 3/1981 | Kranz et al. |
|---|---|---|
| 4,261,845 A | 4/1981 | Cuscurida |
| 4,824,888 A | 4/1989 | Emmerling et al. |
| 5,525,654 A | 6/1996 | Podola et al. |
| 5,756,632 A | 5/1998 | Ward et al. |
| 6,069,184 A * | 5/2000 | Bleys et al. .................. 521/159 |
| 6,218,462 B1 | 4/2001 | Pantone et al. |
| 6,325,887 B1 * | 12/2001 | Amirsakis ................. 156/331.7 |
| 6,355,721 B1 | 3/2002 | Pantone et al. |
| 6,384,130 B1 | 5/2002 | Pantone et al. |
| 6,403,702 B1 | 6/2002 | Markusch et al. |
| 6,503,980 B2 | 1/2003 | Pantone et al. |
| 6,838,516 B2 * | 1/2005 | Dai et al. ........................ 525/58 |
| 2002/0123641 A1 | 9/2002 | Mente et al. |
| 2005/0004284 A1 | 1/2005 | Koenemann et al. |
| 2005/0049358 A1 * | 3/2005 | Dai et al. ...................... 524/589 |
| 2008/0227929 A1 | 9/2008 | Jozef et al. |
| 2009/0069456 A1 | 3/2009 | Bleys et al. |

FOREIGN PATENT DOCUMENTS

| EP | 1 104 775 | 6/2001 |
|---|---|---|
| EP | 1 106 634 | 6/2001 |
| EP | 1 108 735 | 6/2001 |
| EP | 1 217 021 | 6/2002 |
| WO | WO 03/048223 | 6/2003 |
| WO | WO 2005/123836 | 12/2005 |
| WO | WO 2007/042407 | 4/2007 |
| WO | WO 2007/104623 | 9/2007 |

OTHER PUBLICATIONS

G. Woods, "Isocyanates", *ICI Polyurethanes Handbook*, 1990, $2^{nd}$ edition, pp. 32-35.

* cited by examiner

*Primary Examiner* — Randy Gulakowski
*Assistant Examiner* — Mike M Dollinger
(74) *Attorney, Agent, or Firm* — Robert A. Diaz

(57) ABSTRACT

Composition obtained by reacting a polyisocyanate which is a diphenylmethane diisocyanate, optionally comprising a homologue comprising 3 or more isocyanate groups, and/or a variant of such diisocyanate with a monoalkylether of a polyoxyalkylene monoamine having an average molecular weight of 550-3000 and an oxyethylene content of more than 50% by weight, calculated on the weight of the monoamine, and the alkyl group having 1-4 carbon atoms at index of 100-250. It is used as plasticizer, particularly in polyurethane and/or polyurea materials.

16 Claims, No Drawings

US 8,283,421 B2

COMPOSITION FROM A POLYISOCYANATE AND A POLYETHER MONOAMINE

CROSS-REFERENCE TO RELATED APPLICATIONS

This application is the National Phase of International Application PCT/EP2008/066845 filed Dec. 5, 2008 which designated the U.S. and which claims priority to EP Provisional App. Serial No. 07123610.3 filed Dec. 19, 2007. The noted applications are incorporated herein by reference.

The present invention relates to a novel composition from a polyisocyanate and a polyether monoamine, to a process for preparing such a composition, to the use of such a composition as a plasticizer in thermoplastic and thermosetting materials having a hardblock content of less than 50% and comprising a plurality of urethane and/or urea groups, to a process for preparing such materials using such composition and to such materials comprising such composition.

Current practice to make such soft thermosetting and thermoplastic materials having a hardblock content of less than 50% is to add unreactive plasticizers. Often used plasticizers are phthalates or other relatively low molecular weight solvent-type materials. These plasticizers, however, show the tendency to exude over time which may result in a consequential degradation of material properties and fogging.

Therefore plasticizers have been developed which tend to migrate less, like in EP 1106634, U.S. Pat. No. 6,218,462 and U.S. Pat. No. 6,503,980. However there remains room for improvement.

U.S. Pat. No. 4,255,203 discloses a pigment formulation comprising a urea derivative which is the reaction product of a naphthylene diisocyanate or a 4,4'-diphenylenemethane diisocyanate and a monoamine, giving printing inks and paints excellent tinctorial properties. The monoamine may be a polyether monoamine having a molecular weight of less than 350, comprising not more than 4 oxyethylene groups.

In U.S. Pat. No. 4,261,845 the monoamine used to prepare the ureas is a polyether having 2-10 ether groups capped with an alkyl group having 10-19 carbon atoms. The ureas are used as thickening agents.

U.S. Pat. No. 5,525,654 describes the use of diurethanes as plasticizers in sealing and/or adhesive compositions. The diurethanes may be the reaction products of diisocyanates and mono-functional alcohols, which may be selected from monoalkyl polyether alcohols. U.S. Pat. No. 4,824,888 also describes the use of diurethanes in sealings.

EP 1106634 relates to plasticizers comprising the reaction product of an isocyanate-terminated polyether prepolymer and a monofunctional alcohol having a molecular weight of about 32 to about 1000. The plasticizer has a high molecular weight and is liquid and non-migrating and is non-reactive; it is used in elastomers.

U.S. Pat. No. 6,218,462 relates amongst others to plasticizers made from polyisocyanates and mono alcohols having a molecular weight of more than 4000. They are used in elastomers.

US 2002/0123641 discloses a parting agent for use with isocyanate wood binder resins. The parting agent is made from a polyisocyanate and an alkoxylated polyether having one isocyanate-reactive group, the alkoxy group comprising 6 or more carbon atoms. Only polyether monools have been used.

EP 1104775 discloses the use of liquid, diurethane plasticizers made from a diisocyanate and a monoalcohol having a molecular weight of about 100 to about 1000. EP 1108735 and EP 1217021 also relate to polyurethane plasticizers.

WO 03/048223 discloses compounds which are suitable as dispersion agents for pigments. These compounds may be made by reacting a diisocyanate and a polyether monoamine or polyether monool. The polyether monoamine may contain a high amount of oxyethylene groups. A compound based on diphenylmethane diisocyanate and a polyether monoamine having a higher molecular weight has not been made.

WO07/042,407 discloses a process for preparing an elastomeric polyisocyanurate polyurethane material having a hard block content of at most 49%.

WO/07/104,623 discloses products which are obtained by reacting a diisocyanate, a monoalkoxy polyoxyalkylene monoamine and water. They are used as cell opener and rheology modifier.

Polyurethane Industry 2006, 21 (2): 1-3 discloses plasticizers made from diisocyanates, diols and monools and from monoisocyanates and monools.

Surprisingly, we have found a novel composition which is useful as a plasticizer, which is liquid at 50° C. and atmospheric pressure, does not migrate or exude in materials comprising a plurality of urethane and/or urea groups and is more effective than previously proposed urethane plasticizers.

Therefore the present invention is concerned with a composition obtained by reacting at an index of 100-250 a polyisocyanate which is a diphenylmethane diisocyanate, optionally comprising a homologue comprising 3 or more isocyanate groups, and/or a variant of such diisocyanate with a monoalkylether of a polyoxyalkylene monoamine having an average molecular weight of 550-3000 and an oxyethylene content of more than 50% by weight, calculated on the weight of the monoamine, and the alkyl group having 1-4 carbon atoms.

Further the present invention is concerned with a process for preparing such a composition which comprises combining and mixing a polyisocyanate which is a diphenylmethane diisocyanate, optionally comprising a homologue comprising 3 or more isocyanate groups, and/or a variant of such diisocyanate with a monoalkylether of a polyoxyalkylene monoamine having an average molecular weight of 550-3000 and an oxyethylene content of more than 50% by weight, calculated on the weight of the monoamine, and the alkyl group having 1-4 carbon atoms, in such relative amounts that the index is 100-250 and allowing this polyisocyanate and monoamine to react. No other reactants are used in preparing the composition according to the present invention.

Still further the present invention is concerned with the use of the above composition as plasticizer in thermoplastic and thermosetting materials having a hardblock content of less than 50% and comprising a plurality of urethane and/or urea groups.

Still further the present invention is related to a process for making a plasticized thermoplastic or thermosetting material having a hardblock content of less than 50% and comprising a plurality of urethane and/or urea groups, which process comprises combining and mixing the composition of the present invention with 1) the ingredients used to make said thermoplastic or thermosetting material and allowing these ingredients to react to form said material and/or 2) such thermoplastic material.

Finally the present invention is related to plasticized thermoplastic or thermosetting materials having a hardblock content of less than 50% and comprising a plurality of urethane and/or urea groups comprising the composition according to the present invention.

In the context of the present invention the following terms have the following meaning:

1) isocyanate index or NCO index or index:

the ratio of NCO-groups over isocyanate-reactive hydrogen atoms present in a formulation, given as a percentage:

$$\frac{[NCO] \times 100(\%)}{[\text{active hydrogen}]}.$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) The term "hardblock content" refers to 100 times the ratio of the amount (in pbw) of polyisocyanate+isocyanate-reactive materials having a molecular weight of 500 or less (wherein polyols having a molecular weight of more than 500 incorporated in the polyisocyanates are not taken into account) over the amount (in pbw) of all polyisocyanate+ all isocyanate-reactive materials used. In this calculation the amount of the composition according to the present invention used in the thermosetting or thermoplastic material is not taken into account. The hardblock content of the thermosetting or thermoplastic material is at least 5% and preferably at least 10%.

Preferably the polyisocyanate for making the composition according to the present invention is selected from 1) a diphenylmethane diisocyanate comprising at least 35%, preferably at least 60% and most preferably at least 85% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a diphenylmethane diisocyanate comprising a homologue comprising 3 or more isocyanate groups; and 5) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec$^R$ MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec$^R$ 2020, ex Huntsman. Urethane modified variants of the above polyisocyanate 1) are also known in the art, see e.g. The ICI Polyurethanes Book by G. Woods 1990, $2^{nd}$ edition, pages 32-35. Polyisocyanate 4) is also widely known and commercially available. These polyisocyanates are often called crude MDI or polymeric MDI. Examples are Suprasec$^R$ 2185 and Suprasec$^R$ DNR ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec$^R$ 2021 ex Huntsman Polyurethanes.

The monoalkylether of a polyoxyalkylene monoamine used to prepare the composition according to the present invention preferably has an average molecular weight of 800-2500 and an oxyethylene content of 60-90% by weight calculated on the weight of the monoamine.

The most preferred of these monoamines are monomethylether polyoxyethylene polyoxypropylene monoamines having the oxyethylene and oxypropylene groups randomly distributed. The monoamines used to prepare the composition according to the present invention are made by alkoxylating an alkylmonoalcohol having 1-4 carbon atoms and by subsequently converting the polyoxyalkylene monol into a monoamine. Such compounds are known and commercially available; examples are Jeffamine® M2070 and M1000 ex Huntsman; Jeffamine is a trade mark of the Huntsman Corporation or an affiliate thereof which has been registered in one or more but not all countries.

The relative amounts of the polyisocyanate and the monoamine, used to prepare the composition according to the present invention, may vary in such a way that the index is 100-250 and preferably of 100-200. The composition is prepared by combining and mixing the polyisocyanate and the monoamine and allowing the mixture to react. When the reaction is conducted at an index of 100, urea groups are formed from the amine groups and the isocyanate groups.

This reaction is exothermic and does not need heating or catalysis; although the MDI may be added at slightly elevated temperature (e.g. up to 60° C.) in order to ensure liquidity. After the reacting mixture has cooled back to room temperature, the reaction may be regarded as complete. When the reaction is conducted at an index of more than 100, the excess of the polyisocyanate is to react with formed urea groups leading to biuret groups. This reaction preferably is encouraged by conducting the reaction at elevated temperature, e.g. 80-150° C. for e.g. 30 minutes-24 hours. The composition obtained contains urea compounds and—in case the index was above 100—compounds comprising biuret groups, is liquid at 50° C. and atmospheric pressure and does not foam urethane, urea or isocyanurate groups in the presence of polyisocyanates, polyols and polyamines.

The compositions according to the present invention are useful as plasticizers in thermoplastic and thermosetting materials having a hardblock content of less than 50% and comprising a plurality of urethane and/or urea groups.

Such materials are widely known. Polyurethanes are made by reacting polyisocyanates and polyols. Polyureas are made by reacting polyisocyanates and polyamines and/or water. Materials comprising a plurality of urethane and urea groups are made by reacting polyisocyanates, polyols and polyamines and/or water.

In order to ensure that the hardblock content is less than 50%, the amount of polyisocyanates and isocyanate-reactive ingredients having a molecular weight of 500 or less and those having a molecular weight of more than 500 are chosen in such a way that the hardblock content of the materials is less than 50% as defined hereinbefore.

In making these materials, the polyisocyanates may be selected from the polyisocyanates known in the art for preparing such materials, like aliphatic and aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI). MDI and polyisocyanate compositions comprising MDI are most preferred.

Polyols and polyamines, having a molecular weight of more than 500, used in making these materials may be selected from those known in the art for this purpose. Preferred ones are polyester polyols, polyether polyols, polyether polyester polyols, polyester polyamines and polyether polyamines. Preferably these polyols have an average molecular weight of more than 500 to 10,000 and an average nominal functionality of 2-6.

In addition to the above ingredients, other ingredients used in the art for making these materials may be used like chain extenders and cross-linkers having a molecular weight of 500 or less, catalysts for enhancing urethane formation, catalysts for enhancing trimerization of isocyanates (resulting in isocyanurates), other catalysts, surfactants, fire retardants, colourants, pigments, anti-microbial agents, fillers, internal mould release agents, blowing agents which may be physical blowing agents and/or chemical blowing agents including water, cell-stabilizing agents and cell-opening agents.

The amount of composition according to the present invention used in making the thermosetting or thermoplastic materials according to the present invention may vary of from 5-80 and preferably 10-70% by weight, calculated on the total weight of these thermosetting or thermoplastic materials according to the present invention (hence the weight of these—unplasticized—materials+plasticizer). In preparing these materials, the composition according to the present invention may be added to the reaction mixture independently or after having been premixed with one or more of the ingredients used to make these materials (the composition according to the present invention does not form urethane, urea or isocyanurate groups in the presence of polyisocyanates, polyols and polyamines). This provides a further advantage in preparing such materials. On an industrial scale such materials are often made by feeding separate streams of polyisocyanate, polyol and/or polyamine and/or further ingredients to a mixer and/or a reactor. Since the composition may be combined with all of these streams, stream ratios may be controlled, improving mixing properties and rheology during production.

Alternatively the composition according to the present invention may be added to a thermoplastic material (after such material has been made) in order to prepare a thermoplastic material according to the present invention.

Further it has been found that the composition according to the present invention, surprisingly, shows better compatibility with the materials than plasticizers made from polyisocyanates and alkylethers of polyoxyalkylene mono-ols.

The invention is illustrated with the following examples.

The following ingredients were used:

Monoamine 1: Jeffamine M2070, a linear polymer having an average molecular weight of about 2000 and comprising at one end a methyl group and at the other a primary amine group and oxyethylene and oxypropylene groups in between, with an oxyethylene content of 76% by weight calculated on the weight of the polymer.

Monoamine 2: Jeffamine M2005, as M2070 but with 8% by weight oxyethylene groups.

Monoamine 3: Jeffamine M600, as M2070 but with 10% by weight oxyethylene groups and average molecular weight of about 600.

Monoamine 4: Jeffamine M1000, as M2070 but with 80% by weight oxyethylene groups and an average molecular weight of about 1000.

Monool 1: Monomethylether of polyoxyethylene polyoxypropylene diol having an average molecular weight of about 2000 and an oxyethylene content of 75% by weight calculated on the weight of the monool.

Monool 2: Monobutylether of polypropylene glycol having a molecular weight of 2500.

Suprasec 1306, 2185, 2020 and 2021: described before.

Suprasec 2433: an isocyanate terminated prepolymer ex Huntsman

Daltorez$^R$ P765: a polyester polyol having a molecular weight of about 2000 ex Huntsman. Daltorez is a trademark of Huntsman Corporation or an affiliate thereof which has been registered in one or more but not all countries.

Daltocel$^R$ F555: a polyether polyol ex Huntsman having a molecular weight of about 5600. Daltocel is a trademark of Huntsman Corporation or an affiliate thereof which has been registered in one or more but not all countries.

Arcol™ 1374: a polyether polyol ex Arco.

Coscat 83: bismuth catalyst ex Vertellus Specialties

Dabco EG: amine catalyst ex Air Products.

Dabco 25S: amine catalyst ex Air Products.

Jeffcat^R ZF22: amine catalyst ex Huntsman Jeffcat is a trademark of Huntsman Corporation or an Affiliate thereof which has been registered in one or more but not all countries.

EXAMPLE 1

Procedure for making compositions according to the present invention and comparative ones: the monofunctional ingredient was put in a 5 liter flask recipient equipped with a stirrer, thermocouple and nitrogen purge. Polyisocyanate was added slowly under stirring (Suprasec 1306 was preheated at 50° C., Suprasec 2185, 2020 and 2021 were not preheated).

In case of the use of monoamines at index 100 no extra heat was applied. In case of the use of monoamines at index of 150 and 200 the mixture was heated to 120° C. for 5 hours. In case of the use of monool, 0.025% w of dibutyltindilaurate (catalyst) was added and the mixture was kept at 80° C. for 3 hours.

The following Table 1 gives the polyisocyanates, monofunctional ingredients and index used and the viscosity in cPs at 25° C. measured with a Brookfield Viscometer CAP 2000+ with CAP spindle number 1.

TABLE 1

| Composition | Polyisocyanate | Monofunctional ingredient | Index | Viscosity |
|---|---|---|---|---|
| 1 | S1306 | M2070 | 100 | 3200 |
| 2* | S1306 | M2005 | 100 | 4300 |
| 3* | S1306 | M600 | 100 | 11050 |
| 4* | S1306 | Monool 1 | 100 | 2780 |
| 5 | S1306 | M2070 | 150 | 5685 |
| 6 | S2185 | M2070 | 100 | 8850 |
| 7 | S2185 | M2070 | 150 | liquid at 25° C. |
| 8 | S1306 | M2070 | 200 | 15280 |
| 9 | S1306 | M2070/M1000; 80/20 w/w | 100 | liquid at 50° C. |
| 10* | S1306 | Monool 2 | 100 | 12150 |
| 11 | S2020 | M2070 | 100 | 3770 |
| 12 | S2020 | M2070 | 150 | 5320 |
| 13 | S2021 | M2070 | 100 | 5480 |
| 14 | S2021 | M2070 | 150 | 9130 |

*= comparative

Compositions 1, 5-9 and 11-14 are according to the present invention. Infrared analysis showed no free NCO groups in these compositions, the presence of urea groups in case an index of 100 was used and the presence of urea and biuret groups in case an index of 150 and 200 was used.

EXAMPLE 2

Blown elastomers were made as follows:
a polyol blend including a composition as made in Table 1 (when used) was mixed with polyisocyanate for 15 seconds. 200 g of this mixture was poured in an aluminium mould of 15×20×1.5 cm which was kept at 60° C. Then the mould was closed and the mixture was allowed to react. After 5 minutes the elastomer was demoulded and post cured in an oven at 100° C. for 4 hours.

Table 2 gives the ingredients used for making the elastomers and the amounts in parts by weight and some physical properties.

In comparative elastomers 6, 7 and 8 the hardness and compression hardness could not be determined since the resulting material was sticky and the plasticizer exuded considerably.

TABLE 2

| Elastomer | 1* | 2 | 3* | 4 | 5* | 6* | 7* | 8* |
|---|---|---|---|---|---|---|---|---|
| Polyol Blend | | | | | | | | |
| Arcol 1374 | — | — | — | — | — | — | — | — |
| Daltocel F555 | 57.52 | 46 | 47.56 | 38 | 38 | 38 | 38 | 38 |
| Butanediol | 4.72 | 3.78 | 6.66 | 5.33 | 5.33 | 5.33 | 5.33 | 5.33 |
| water | 0.2 | 0.16 | 0.19 | 0.15 | 0.15 | 0.15 | 0.15 | 0.15 |
| Dabco 25S | 0.46 | 0.37 | 0.38 | 0.3 | 0.3 | 0.3 | 0.3 | 0.3 |
| Jeffcat ZF22 | 0.11 | 0.09 | 0.1 | 0.08 | 0.08 | 0.08 | 0.08 | 0.08 |
| Composition 1 | — | 20 | — | 20 | — | — | — | — |
| 2 | — | — | — | — | — | 20 | — | — |
| 3 | — | — | — | — | — | — | 20 | — |
| 4 | — | — | — | — | 20 | — | — | — |
| 10 | — | — | — | — | — | — | — | 20 |
| Suprasec 2433 | 37 | 29.6 | 45.12 | 36.1 | 36.1 | 36.1 | 36.1 | 36.1 |
| Hardblock content, % | 27 | 27 | 34 | 34 | 34 | 34 | 34 | 34 |
| Density kg/m³, ISO 845 | 412 | 416 | 422 | 420 | 416 | 412 | 418 | 420 |
| Hardness Shore A, ISO 868 | 22 | 8 | 35 | 15 | 18 | ND | ND | ND |
| Compression Hardness at 65%, kPa, ISO 3386-1 | 885 | 470 | 1220 | 630 | 715 | ND | ND | ND |

| Elastomer | 9* | 10 | 11* | 12 | 13* | 14 | 15* | 16* |
|---|---|---|---|---|---|---|---|---|
| Polyol Blend | | | | | | | | |
| Arcol 1374 | — | — | 57.52 | 46 | 31.8 | 25.4 | 25.4 | 25.4 |
| Daltocel F555 | 31.8 | 25.4 | — | — | — | — | — | — |
| Butanediol | 9.52 | 7.62 | 4.72 | 3.78 | 9.50 | 7.62 | 7.62 | 7.62 |
| water | 0.19 | 0.15 | 0.2 | 0.16 | 0.2 | 0.15 | 0.15 | 0.15 |

TABLE 2-continued

| | | | | | | | | |
|---|---|---|---|---|---|---|---|---|
| Dabco 25S | 0.48 | 0.38 | 0.46 | 0.37 | 0.47 | 0.38 | 0.38 | 0.38 |
| Jeffcat ZF22 | 0.12 | 0.1 | 0.11 | 0.09 | 0.12 | 0.1 | 0.1 | 0.1 |
| Composition 1 | — | 20 | — | 20 | — | 20 | — | — |
| 2 | — | — | — | — | — | — | — | 20 |
| 3 | — | — | — | — | — | — | — | — |
| 4 | — | — | — | — | — | — | — | — |
| 10 | — | — | — | — | — | — | 20 | — |
| Suprasec 2433 | 57.9 | 46.3 | 37 | 29.6 | 57.9 | 46.3 | 46.3 | 46.3 |
| Hardblock content, % | 45 | 45 | 27 | 27 | 45 | 45 | 45 | 45 |
| Density kg/m³, ISO 845 | 413 | 419 | 410 | 409 | 426 | 430 | 423 | 428 |
| Hardness Shore A, ISO 868 | 48 | 24 | 29 | 7 | 64 | 32 | 45 | 38 |
| Compression Hardness at 65%, kPa, ISO 3386-1 | 1860 | 840 | 1070 | 400 | 2750 | 985 | 1800 | 1295 |

*= comparative
ND = not determined; sticky, not useful material

EXAMPLE 3

Non-blown elastomers were made by mixing the polyol blends and polyisocyanates as given in Table 3 for 15 seconds and casting the mixture at 2 mm thickness in an open mould which was kept at 80° C. After 5 minutes the elastomer was demoulded and post cured in an oven at 120° C. for 4 hours. Table 3 gives the ingredients used, the amounts in pbw and some physical properties

TABLE 3

| Elastomer | 1* | 2 | 3 | 4 | 5 | 6 |
|---|---|---|---|---|---|---|
| Polyol Blend | | | | | | |
| Daltorez P765 | 57.02 | 39.91 | 34.21 | 34.21 | 39.91 | 34.21 |
| 1,4 butanediol | 8.44 | 5.91 | 5.07 | 5.07 | 5.91 | 5.07 |
| Dabco EG | 0.14 | 0.10 | 0.09 | 0.09 | 0.10 | 0.09 |
| Composition 1 | — | 30 | 40 | — | — | — |
| 8 | — | — | — | 40 | — | — |
| 6 | — | — | — | — | 30 | — |
| 7 | — | — | — | — | — | 40 |
| Suprasec 2020 | 34.39 | 24.08 | 20.64 | 20.64 | 24.08 | 20.64 |
| Hardblock content, % | 43 | 43 | 43 | 43 | 43 | 43 |
| Hardness, Shore A, ISO 868 | 81 | 53 | 38 | 36 | 53 | 38 |

EXAMPLE 4

Thermoplastic polyurethane plaques were produced by using reactive extrusion and cold water pelletization, drying the pellets and injection moulding them into plaques on a Ottogalli injection moulding machine.

In making TPU 2, the composition 1 was added during the reactive extrusion as an independent stream.

TPU1 is comparative. The ingredients, amounts in parts by weight and physical properties are given in Table 4.

TABLE 4

| | TPU | |
|---|---|---|
| | 1* | 2 |
| Daltorez P765 | 60.08 | 48.06 |
| 1,4 butanediol | 8.76 | 7.00 |
| Coscat 83 | 0.007 | 0.006 |

TABLE 4-continued

| | TPU | |
|---|---|---|
| | 1* | 2 |
| Suprasec 1306 | 31.15 | 24.93 |
| Composition 1 | — | 20 |
| Hardblock content, % | 40 | 40 |
| Hardness, Shore D, ISO 868 | 36 | 22 |

*comparative

The invention claimed is:

1. A thermoplastic or thermosetting material comprising a urethane group, a urea group, or combinations thereof, and wherein the material has a hardblock content of less than 50% by weight, and wherein the material further comprises a reaction product obtained by reacting, at an NCO index of 100-250, (i) a polyisocyanate and (ii) a monoalkylether of a polyoxyalkylene monoamine wherein component (ii) comprises an average molecular weight of 550-3000 and an oxyethylene content of more than 50% by weight, calculated on the weight of the monoamine, and wherein the alkyl group of component (ii) comprises 1-4 carbon atoms, and wherein the reaction product does not form urethane, urea or isocyanurate groups in the presence of polyisocyanates, polyols and polyamines.

2. The material of claim 1, wherein component (ii) comprises a molecular weight of 800-2500 and an oxyethylene content of 60-90% by weight, and wherein the alkyl group comprises a methyl group.

3. The material of claim 1, wherein the reaction product has been obtained by reacting at an NCO index of more than 100.

4. The material of claim 1, wherein the reacting is conducted at a temperature from about 80° C. to about 150° C. and an NCO index of more than 100, and wherein the reaction product comprises biuret groups.

5. The material of claim 1, wherein the polyisocyanate comprises:
 (a) a carbodiimide or uretonimine modified variant of a diphenylmethane diisocyanate comprising at least 35% by weight of 4,4'-diphenylmethane diisocyanate, the variant comprising an NCO value of 20% by weight or more;
 (b) a urethane modified variant of a diphenylmethane diisocyanate comprising at least 35% by weight of 4,4'-diphenylmethane diisocyanate, the variant comprising an NCO value of 20% by weight or more and being the reaction product of an excess of this diphenylmethane diisocyanate and a polyol comprising an average nominal hydroxyl functionality of 2-4 and an average molecular weight of at most 1000;

(c) a diphenylmethane diisocyanate comprising a homologue comprising 3 or more isocyanate groups; or (d) mixtures thereof.

6. A process for making a plasticized thermoplastic or thermosetting material comprising a urethane group, a urea group, or combinations thereof, and wherein the material has a hardblock content of less than 50% by weight, and wherein the process comprises combining and mixing (A) a composition obtained by reacting, at an NCO index of 100-250, (i) a polyisocyanate with (ii) a monoalkylether of a polyoxyalkylene monoamine comprising an average molecular weight of 550-3000 and an oxyethylene content of more than 50% by weight, calculated on the weight of the monoamine, and wherein the alkyl group of component (ii) comprises 1-4 carbon atoms, and wherein the composition does not form urethane, urea or isocyanurate groups in the presence of polyisocyanates, polyols and polyamines; with (B) reactive ingredients used to make said thermoplastic or thermosetting material and allowing these ingredients to react to form said material; or (C) such thermoplastic or thermosetting material; and wherein the amount of the composition ranges from 5 to 80% by weight calculated on the total weight of the thermoplastic or thermosetting material.

7. The process according to claim 6 wherein component (ii) comprises a molecular weight of 800-2500 and an oxyethylene content of 60-90% by weight and wherein the alkyl group comprises a methyl group.

8. The process according to claim 6 wherein the composition has been obtained by reacting at an NCO index of more than 100.

9. The process according to claim 6 wherein the composition is obtained by reacting at a temperature from about 80° C. to about 150° C. and an NCO index of more than 100, and wherein the composition comprises biuret groups.

10. The process according to claim 6 wherein the polyisocyanate comprises:

(a) a carbodiimide or uretonimine modified variant of a diphenylmethane diisocyanate comprising at least 35% by weight of 4,4'-diphenylmethane diisocyanate, the variant comprising an NCO value of 20% by weight or more;

(b) a urethane modified variant of a diphenylmethane diisocyanate comprising at least 35% by weight of 4,4'-diphenylmethane diisocyanate, the variant comprising an NCO value of 20% by weight or more and being the reaction product of an excess of this diphenylmethane diisocyanate and a polyol comprising having an average nominal hydroxyl functionality of 2-4 and an average molecular weight of at most 1000;

(c) a diphenylmethane diisocyanate comprising a homologue comprising 3 or more isocyanate groups; or (d) mixtures thereof.

11. A thermoplastic or thermosetting material comprising a urethane group, a urea group, or combinations thereof, and wherein the material has a hardblock content of less than 50% by weight and wherein the material further comprises a composition obtained by reacting, at an NCO index of 100-250, (i) a polyisocyanate with (ii) a monoalkylether of a polyoxyalkylene monoamine comprising an average molecular weight of 550-3000 and an oxyethylene content of more than 50% by weight, calculated on the weight of the monoamine, and wherein the alkyl group of component (ii) comprises 1-4 carbon atoms; and wherein the amount of the composition ranges from 5 to 80% by weight calculated on the total weight of the thermoplastic or thermosetting material, and wherein the composition does not form urethane, urea or isocyanurate groups in the presence of polyisocyanates, polyols and polyamines.

12. The material according to claim 11 wherein component (ii) comprises a molecular weight of 800-2500 and an oxyethylene content of 60-90% by weight and wherein the alkyl group comprises a methyl group.

13. The material according to claim 11 wherein the polyisocyanate comprises:

(a) a carbodiimide or uretonimine modified variant of a diphenylmethane diisocyanate comprising at least 35% by weight of 4,4'-diphenylmethane diisocyanate, the variant comprising an NCO value of 20% by weight or more;

(b) a urethane modified variant of a diphenylmethane diisocyanate comprising at least 35% by weight of 4,4'-diphenylmethane diisocyanate, the comprising having an NCO value of 20% by weight or more and being the reaction product of an excess of this diphenylmethane diisocyanate and a polyol comprising an average nominal hydroxyl functionality of 2-4 and an average molecular weight of at most 1000;

(c) a diphenylmethane diisocyanate comprising a homologue comprising 3 or more isocyanate groups; or (d) mixtures thereof.

14. The composition of claim 1, wherein component (i) comprises diphenylmethane diisocyanate, optionally comprising a homologue comprising 3 or more isocyanate groups, or a variant of such diisocyanate.

15. The composition of claim 6, wherein component (i) comprises diphenylmethane diisocyanate, optionally comprising a homologue comprising 3 or more isocyanate groups, or a variant of such diisocyanate.

16. The composition of claim 11, wherein component (i) comprises diphenylmethane diisocyanate, optionally comprising a homologue comprising 3 or more isocyanate groups, or a variant of such diisocyanate.

* * * * *